(12) United States Patent
Nogami et al.

(10) Patent No.: US 10,645,546 B2
(45) Date of Patent: May 5, 2020

(54) INFORMATION PROCESSING APPARATUS AND METHOD FOR DETERMINING SERVICE

(71) Applicant: FUJITSU LIMITED, Kawasaki-shi, Kanagawa (JP)

(72) Inventors: Kenji Nogami, Setagaya (JP); Yasuhide Matsumoto, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/402,657

(22) Filed: May 3, 2019

(65) Prior Publication Data

US 2019/0349726 A1 Nov. 14, 2019

(30) Foreign Application Priority Data

May 10, 2018 (JP) .................................. 2018-091682

(51) Int. Cl.
*H04W 24/00* (2009.01)
*H04W 4/30* (2018.01)
*H04W 4/20* (2018.01)

(52) U.S. Cl.
CPC ............... *H04W 4/30* (2018.02); *H04W 4/20* (2013.01)

(58) Field of Classification Search
None
See application file for complete search history.

(56) References Cited

U.S. PATENT DOCUMENTS

| 2002/0013717 A1 | 1/2002 | Ando et al. |
| 2008/0051919 A1 | 2/2008 | Sakai et al. |
| 2010/0048272 A1* | 2/2010 | Koh .................... A63F 13/00 463/7 |

FOREIGN PATENT DOCUMENTS

| JP | 2000-276525 | 10/2000 |
| JP | 2001-297210 | 10/2001 |
| JP | 2002-041838 | 2/2002 |
| JP | 2007-035050 | 2/2007 |
| JP | 2008-048757 | 3/2008 |

* cited by examiner

*Primary Examiner* — Erika A Washington
(74) *Attorney, Agent, or Firm* — Fujitsu Patent Center

(57) ABSTRACT

An information processing apparatus includes a memory and a processor coupled to the memory. The memory is configured to store desired conditions of desired services received from respective service consumer terminals. The memory is configured to store a providing condition of a providable service received from a service provider terminal. The processor is configured to read the desired conditions from the memory. The processor is configured to read the providing condition from the memory. The processor is configured to determine, from among the desired services, a recommended service to be transmitted to the service provider terminal based on exercise information on an exercise amount of a user of the service provider terminal and a degree of matching between the providing condition and each of the desired conditions. The exercise information is received from the service provider terminal.

12 Claims, 8 Drawing Sheets

FIG. 3

| SERVICE PROVIDER | DATE | SKILL | ADDRESS | ... |
|---|---|---|---|---|
| Z | 20180601 | NONE | TOWN A | |

| SERVICE CONSUMER | DATE | WORK | LOCA-TION | NECESSARY SKILL | ... |
|---|---|---|---|---|---|
| A | 20180601 | INTERPRETA-TION | TOWN A | ENGLISH CONVERSATION | |
| B | 20180601 | TRANSLATION | TOWN B | ENGLISH CONVERSATION | |
| C | 20180601 | WEEDING | TOWN A | | |
| D | 20180601 | SWEEPING SNOW ON ROOF | TOWN B | | |
| ... | ... | ... | ... | | |

| SERVICE PROVIDER | NUMBER OF STEPS FOR LAST WEEK | ADDRESS | ... |
|---|---|---|---|
| Z | 5,000 STEPS | TOWN A | |

INFORMATION PROCESSING APPARATUS AND METHOD FOR DETERMINING SERVICE

CROSS-REFERENCE TO RELATED APPLICATION

This application is based upon and claims the benefit of priority of the prior Japanese Patent Application No. 2018-091682, filed on May 10, 2018, the entire contents of which are incorporated herein by reference.

FIELD

The embodiments discussed herein are related to an information processing apparatus and a method for determining a service.

BACKGROUND

In the related art, there has been known a technology in which when a providing condition of a service provider and a desired condition of a service consumer are registered in a server, a matching between the providing condition and the desired condition is performed, and when the providing condition and the desired condition match each other, the matching result is notified to both the service provider and the service consumer.

Related techniques are disclosed in, for example, Japanese Laid-open Patent Publication No. 2001-297210.

However, in the related art, there is no indicator with which the service provider selects one of the multiple matching results when multiple matching results are notified. As a result, the service provider may become embarrassed in selecting a service, and thus, miss an opportunity to provide a service, or may take over an easy work, and thus, leave a lot of capability.

SUMMARY

According to an aspect of the present invention, provided is an information processing apparatus including a memory and a processor coupled to the memory. The memory is configured to store desired conditions of desired services received from respective service consumer terminals. The memory is configured to store a providing condition of a providable service received from a service provider terminal. The processor is configured to read the desired conditions from the memory. The processor is configured to read the providing condition from the memory. The processor is configured to determine, from among the desired services, a recommended service to be transmitted to the service provider terminal based on exercise information on an exercise amount of a user of the service provider terminal and a degree of matching between the providing condition and each of the desired conditions. The exercise information is received from the service provider terminal.

The object and advantages of the disclosure will be realized and attained by means of the elements and combinations particularly pointed out in the claims. It is to be understood that both the foregoing general description and the following detailed description are exemplary and explanatory and are not restrictive of the disclosure, as claimed.

BRIEF DESCRIPTION OF DRAWINGS

FIG. 3 is a view illustrating an example of a providing condition table;

FIG. 4 is a view illustrating an example of a desired condition table;

DESCRIPTION OF EMBODIMENTS

Hereinafter, embodiments will be described with reference to the accompanying drawings. In addition, embodiments to be described hereinbelow do not limit the present disclosure. The respective embodiments may be appropriately combined with each other within the scope that does not cause any inconsistency in contents of processes.

Embodiments (System Configuration)

In the recent society of low fertility and aging, healthy aged persons called active seniors who are interested in a social contribution are increasing. The active seniors strongly desire to perform social activities during their lifetime, and hope to execute a social contribution by acting as a service provider and providing a service consumer with a service, in order to make use of their rich experience and knowledge.

In a system including a providing apparatus 10 according to the present embodiment, a matching is performed between a providing condition of a service provider and a desired condition of a service consumer, and a service to be provided is recommended to the service provider in consideration of an exercise amount of the service provider. Here, the service is a work such as, for example, interpretation, translation, or weeding.

Figure 1:
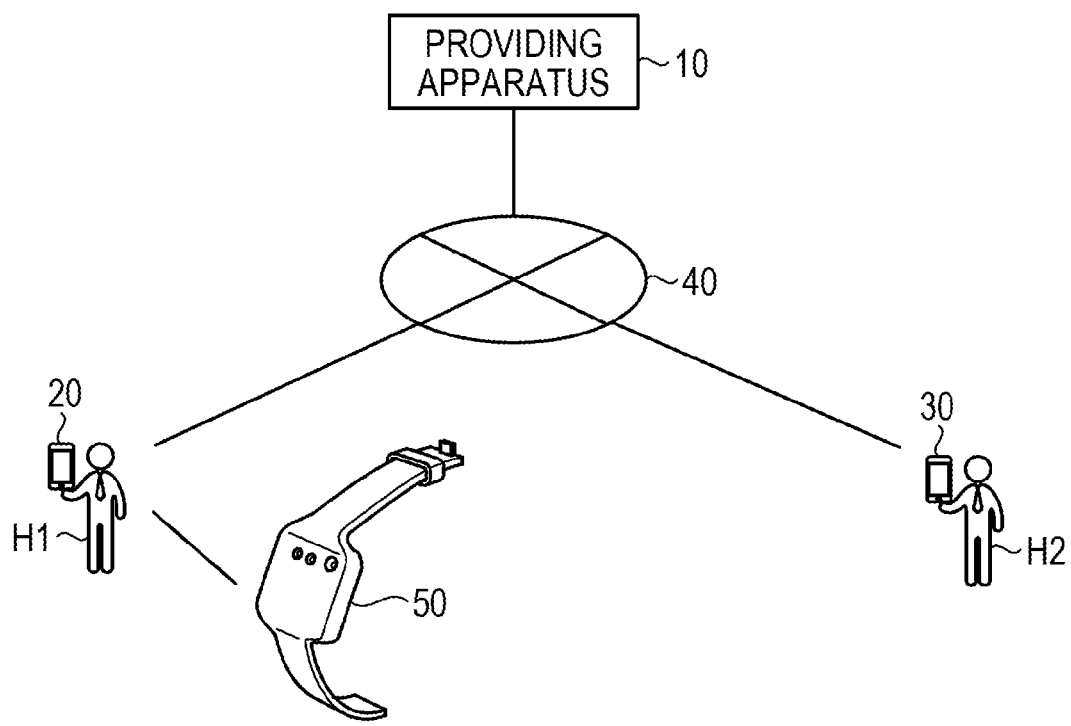
FIG. 1 is a view illustrating a configuration of a system according to an embodiment.

FIG. 1 is a view illustrating a configuration of a system including the providing apparatus 10 according to the present embodiment. The system illustrated in FIG. 1 includes the providing apparatus 10, a service provider terminal 20, and a service consumer terminal 30, which are connected to each other to communicate via a network 40.

The service provider terminal 20 is a mobile terminal device such as a smart phone possessed by a service provider H1. The service provider H1 registers a providing condition related to a providable service in the providing apparatus 10, by using the service provider terminal 20.

In addition, the service provider H1 is equipped with, for example, a vital sensing band 50 that measures three-axis acceleration information. The service provider terminal 20 calculates the number of steps or a distance of travel on foot from the three-axis acceleration information acquired from the vital sensing band 50, records the number of steps or the travel distance as the exercise history information of the service provider H1, and transmits the exercise history information to the providing apparatus 10, by using, for example, a fitness application.

The service consumer terminal 30 is a mobile terminal device such as a smart phone possessed by a service consumer H2. The service consumer H2 registers the desired condition related to the desired service in the providing apparatus 10, by using the service consumer terminal 30.

The providing apparatus 10 is a relay server that performs a matching between the providing condition of the service provider H1 and the desired condition of the service consumer H2. The providing apparatus 10 recommends a service to be provided to the consumer in consideration of the providing condition such as a hobby or a skill of the service provider H1. At that time, the providing apparatus 10 refers to the exercise history information of the service provider H1 to consider the exercise amount, and recommends, for example, a service requiring going out far on foot or a service requiring a high workload to the service provider H1 who needs to exercise.

(Configuration of Providing Apparatus)

Figure 2:
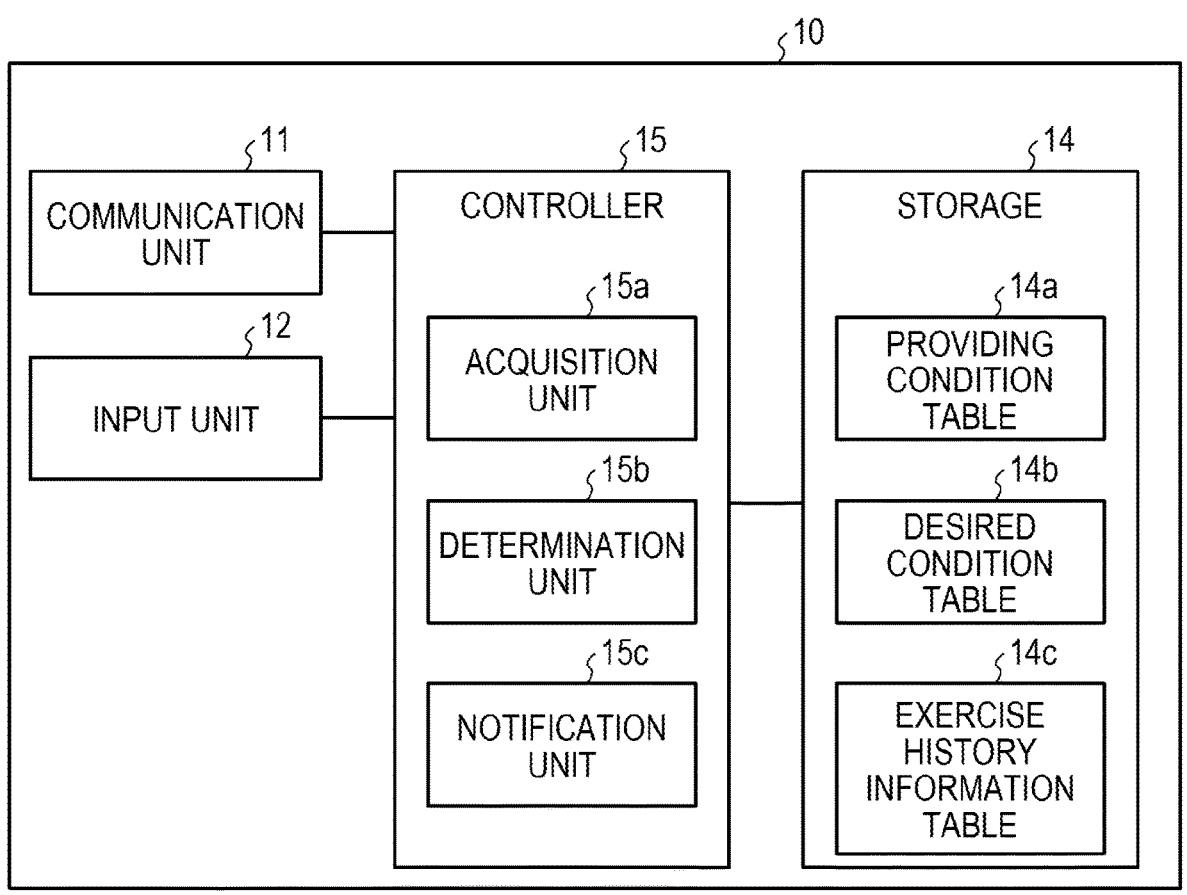
FIG. 2 is a functional block diagram illustrating a configuration of a providing apparatus according to an embodiment.

FIG. 2 is a block diagram illustrating a functional configuration of the providing apparatus 10 according to the present embodiment. As described above, the providing apparatus 10 illustrated in FIG. 2 performs the providing process by performing a matching between the providing condition of the service provider H1 and the desired condition of the service consumer H2, considering the exercise amount of the service provider H1, and recommending a service to the service provider H1.

As an embodiment, the providing apparatus 10 may be mounted by installing a providing program in which the above-described providing process is provided as package software or online software, in a desired computer. For example, the providing apparatus 10 may be mounted by installing the above-described providing program in a server apparatus that accommodates the service provider terminal 20 and the service consumer terminal 30 as client terminals. In this case, the providing apparatus 10 may be mounted as a part of a business system of, for example, a sales management, or may be mounted as a cloud system that provides a service implemented by the above-described providing process through an outsourcing.

While FIG. 2 illustrates the functional units corresponding to the reference numerals 11 to 15, the functional units are merely exemplary. Some of the illustrated functional units may be omitted or a functional unit other than the illustrated functional units may be provided in the providing apparatus 10. For example, when an information processing apparatus used by an administrator is mounted as the providing apparatus 10, the information processing apparatus may include functional units such as a reading unit (e.g., a scanner) and a detection unit (e.g., a sensor), in addition to functional units generally equipped in, for example, a personal computer or a mobile terminal device, such as an input device, an image or sound output device, and a communication interface. In addition, when the providing apparatus 10 is mounted as a part of the business system described above, a database that manages data other than a providing condition table 14a, a desired condition table 14b, and an exercise history information table 14c to be described later may be stored in a storage 14 of the providing apparatus 10, for example, in a main storage device or an auxiliary storage device.

As illustrated in FIG. 2, the providing apparatus 10 includes, for example, a communication unit 11, an input unit 12, the storage 14, and a controller 15. While FIG. 2 represents solid lines for indicating the relationship of input/output of data, the relationship of input/output of data is merely exemplary for the convenience of description. That is, the input/output of data in the respective processing units is not limited to the illustrated example, and input/output of data other than those illustrated, for example, input/output of data between a processing unit and a processing unit, between a processing unit and data, and between a processing unit and an external device may be performed.

The communication unit 11 is a processing unit that controls the data communication between an external device such as the service provider terminal 20 or the service consumer terminal 30 and the controller 15 via the network 4. The communication unit 11 corresponds to a communication device such as, for example, a network interface card (NIC).

The input unit 12 is an input device for inputting various kinds of information to the providing apparatus 10. The input unit 12 corresponds to, for example, a mouse, a keyboard, a touch panel, or an input button.

The storage 14 is a device that stores data used for various programs such as an operating system (OS) or an application program executed by the controller 15. For example, the storage 14 is mounted as a main storage device in the providing apparatus 10. For example, various semiconductor memory elements such as a random access memory (RAM) and a flash memory may be adopted as the storage 14. In addition, the storage 14 may be mounted as an auxiliary storage device. In this case, for example, a hard disk drive (HDD), an optical disk or a solid state drive (SSD) may be adopted.

The storage 14 stores the providing condition table 14a, the desired condition table 14b, and the exercise history information table 14c, as an example of the data used for the programs executed by the controller 15. Together with the data, other electronic data may also be stored in the storage 14.

The providing condition table 14a manages a providing condition related to a providable service of the service provider H1. The providing condition table 14a is collected from the service provider terminal 20 at an appropriate time, and stored in the storage 14. FIG. 3 is a view illustrating an example of the providing condition table 14a according to the present embodiment. As illustrated in FIG. 3, the providing condition table 14a includes, for example, a service provider, a date, a skill, and an address.

Here, the service provider is information for identifying the service provider H1 such as the name of the service provider H1. The date represents a date when the service is providable. The skill represents a notable technique which is providable by the service provider H1 such as an English conversation. The address represents an address of the service provider H1.

FIG. 3 represents, for example, the providing condition in which the service provider is "Z," the date is "20180601," the skill is "none," and the address is "town A." In addition, the providing condition table 14a may include information such as a hobby of the service provider H1.

The desired condition table 14b manages a desired condition related to a service desired by the service consumer H2. The desired condition table 14b is collected from the service consumer terminal 30 at an appropriate time, and stored in the storage 14. FIG. 4 is a view illustrating an example of the desired condition table 14b according to the present embodiment. As illustrated in FIG. 4, the desired condition table 14b includes, for example, a service consumer, a date, a work, a location, and a necessary skill.

Here, the service consumer is information for identifying the service consumer H2 such as the name of the service consumer H2. The date represents a date when the service is desired. The work represents the contents of a service desired by the service consumer H2, such as interpretation, translation, or weeding. The location represents a service desired location, that is, a location where the service consumer H2 desires to receive a service. The necessary skill represents a notable technique such as an English conversation which is necessary for providing a service.

FIG. 4 represents, for example, the desired condition in which the service consumer is "A," the date is "20180601," the work is "interpretation," the location is "town A," and the necessary skill is an "English conversation."

Figure 5:
FIG. 5 is a view illustrating an example of an exercise history information table.

The exercise history information table 14c manages the history of the exercise amount of the service provider H1 such as the number of steps or the distance of travel on foot for a predetermined time period. The exercise history information table 14c is collected from the service provider terminal 20 at an appropriate time, and stored in the storage 14. FIG. 5 is a view illustrating an example of the exercise history information table 14c according to the present embodiment. As illustrated in FIG. 5, the exercise history information table 14c includes, for example, a service provider, the number of steps for last week, and an address.

Here, the number of steps for last week represents the exercise amount of the service provider H1 for a predetermined time period, and FIG. 5 represents an example where the predetermined time period is last one week and the exercise amount is the number of steps. The address represents an address of the service provider H1. FIG. 5 represents, for example, the exercise history information in which the service provider is "Z" the number of steps for last week is "5,000 steps," and the address is "town A."

Referring back to FIG. 2, the controller 15 includes an internal memory that stores various programs or control data, and executes various processes using the programs or control data.

For example, the controller 15 is mounted as a central processing device, a so-called central processing unit (CPU). The controller 15 may not necessarily be mounted as the CPU, and may be mounted as a micro processing unit (MPU) or a digital signal processor (DSP). Accordingly, the controller 15 may be mounted as a processor, regardless of whether the type of the processor is a general-purpose type or a specialized type. In addition, the controller 15 may also be implemented by, for example, a hard-wired logic such as an application specific integrated circuit (ASIC) or a field programmable gate array (FPGA).

The controller 15 virtually implements the following processing units by executing various programs. For example, as illustrated in FIG. 2, the controller 15 includes an acquisition unit 15a, a determination unit 15b, and a notification unit 15c.

The acquisition unit 15a is a processing unit that acquires the above-described providing condition table 14a, desired condition table 14b, and exercise history information table 14c. As an embodiment, the acquisition unit 15a receives an input of a providing condition from the service provider terminal 20 via the communication unit 11, and stores the providing condition in the providing condition table 14a. In addition, the acquisition unit 15a receives an input of a desired condition from the service consumer terminal 30 via the communication unit 11, and stores the desired condition in the desired condition table 14b. Further, the acquisition unit 15a stores the exercise history information received from the service provider terminal 20 via the communication unit 11, in the exercise history information table 14c.

Based on the degree of matching between the desired condition and the providing condition, and the information on the exercise amount of the service provider H1 as the user of the service provider terminal 20 which is received from the service provider terminal 20, the determination unit 15b determines a desired service to be transmitted to the service provider terminal 20.

As an embodiment, first, the determination unit 15b extracts a record of a desired condition in which the degree of matching between the desired condition and the providing condition is equal to or more than a predetermined threshold value. Here, the degree of matching is represented by, for example, a proportion of items which match each other in contents, in a comparison between the record of the providing condition table 14a illustrated in FIG. 3 and each record of the desired condition table 14b illustrated in FIG. 4. In addition, when the contents of predetermined items match each other, it is determined that the degree of matching is equal to or more than the predetermined threshold value.

For example, when the date and the skill (necessary skill) match each other, the determination unit 15b determines that the degree of matching is equal to or more than the predetermined threshold value, and extracts the record of the corresponding desired condition. In the example illustrated in FIG. 4, the record in which the service consumer is "C," the date is "20180601," the work is "weeding," and the location is "town A," and the record in which the service consumer is "D," the date is "20180601," the work is "sweeping snow on the roof," and the location is "town B" are extracted.

Here, the determination unit 15b may extract a record in which the distance between the address of the service provider H1 and the service desired location of the desired service is within a predetermined threshold range. As a result, for example, it is possible to extract a record in which the corresponding distance is within a walking distance range as the predetermined threshold range, and determine a service to be recommended, from desired services which do not require a movement by, for example, a car to the service desired location.

Next, the determination unit 15b determines a desired service to be transmitted to the service provider terminal 20, based on the information on the exercise amount of the service provider H1 who is the user of the service provider terminal 20, and the distance between the service desired location of the desired service and the address of the service provider H1 of the service provider terminal 20.

For example, the determination unit 15b refers to the exercise history information of the service provider "Z" in the record of the providing condition from the exercise history information table 14c illustrated in FIG. 5, as the information on the exercise amount of the user of the service provider terminal 20. Here, the determination unit 15b determines that the service provider "Z" is in the lack of exercise when the value of the exercise history information is less than a predetermined threshold value, and determines that the service provider "Z" is not in the lack of exercise when the value of the exercise history information is equal to or more than the threshold value. For example, when the predetermined threshold value is 10,000 steps, the determination unit 15b determines that the service provider "Z" is in the lack of exercise, in the example illustrated in FIG. 5.

The determination unit 15b determines a service in another town where the distance between the service desired location of the desired service and the address of the user of the service provider terminal is, for example, equal to or more than a predetermined threshold value, as the desired service to be recommended to the service provider H1 determined to be in the lack of exercise. In the examples illustrated in FIGS. 3 to 5, the determination unit 15b determines the desired service in the "town B" which is different from the "town A" of the address of the service provider "Z," as the service to be recommended. That is, the determination unit 15b determines the desired service which corresponds to the service consumer "D," the date "20180601," the work "sweeping snow on the roof," and the location "town B," as the service to be recommended to the service provider "Z."

Further, the determination unit 15b determines a service in the same town where the distance between the service desired location of the desired service and the address of the user of the service provider terminal is, for example, less than a predetermined threshold value, as the desired service to be recommended to the service provider H1 determined not to be in the lack of exercise. In the examples illustrated in FIGS. 3 and 4, the determination unit 15b determines the desired service in the "town A" which is the same as the "town A" of the address of the service provider "Z," as the service to be recommended. That is, the determination unit 15b determines the desired service which corresponds to the service consumer "C," the date "20180601," the work "weeding," and the location "town A," as the service to be recommended to the service provider "Z."

In addition, the determination unit 15b may determine the desired service to be transmitted to the service provider terminal 20, based on the information on the exercise amount of the user of the service provider terminal 20 and the workload of the desired service.

In that case, the workload of the desired service is stored in advance for each work in the storage 14. Alternatively, an input of the workload of the desired service from the service consumer terminal 30 may be received as a part of the desired condition. In addition, the workload may be represented by time taken for a work.

Then, the determination unit 15b refers to, for example, the exercise history information of the service provider H1, and determines a high work-load service of which the workload is equal to or more than a predetermined threshold value, as the desired service to be recommended to the service provider H1 determined to be in the lack of exercise. In addition, the determination unit 15b determines a low work-load service of which the workload is less than the predetermined threshold value, the desired service to be recommended to the service provider H1 determined not to be in the lack of exercise.

In addition, when the providing condition includes a hobby, the determination unit 15b may extract, for example, a record in which the degree of similarity between the hobby and the work of the desired service is equal to or more than a predetermined threshold value. As a result, it is possible to recommend a service in consideration of the hobby of the service provider H1.

Figure 6:
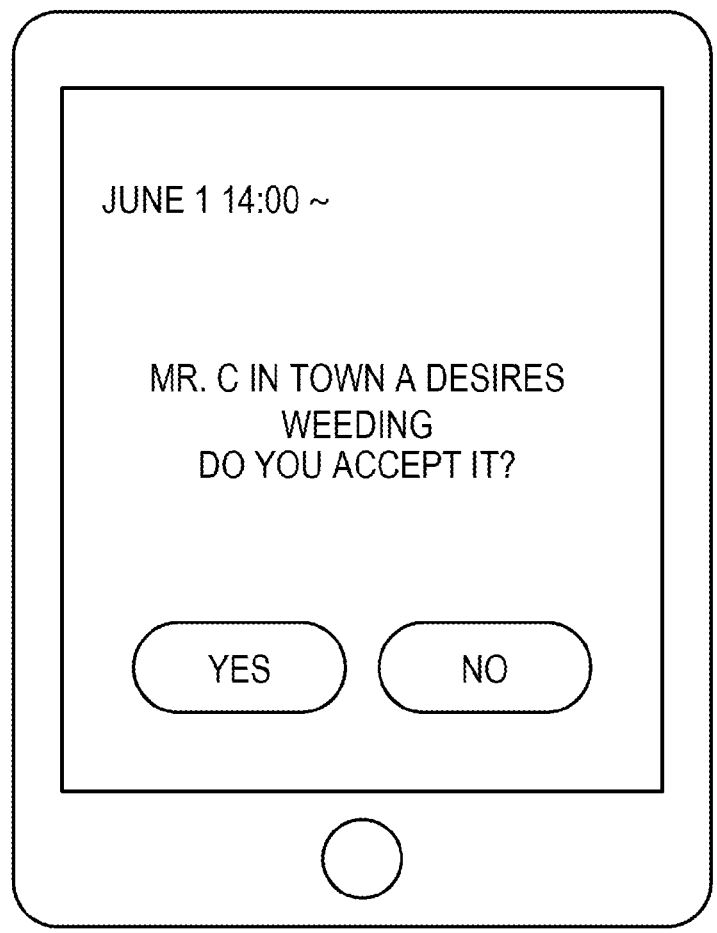
FIG. 6 is a view illustrating an example of a notification of a desired service.

Referring back to FIG. 2, the notification unit 15c notifies the service provider terminal 20 of the desired service that has been determined by the determination unit 15b. Here, FIG. 6 is a view illustrating an example of the notification of the desired service. As an example, as illustrated in FIG. 6, the notification unit 15c transmits a mail for notifying the service provider terminal 20 of the determined desired service via the communication unit 11.

In the example illustrated in FIG. 6, the notification unit 15c notifies the service provider terminal 20 of the desired service which corresponds to the service consumer "C," the location "town A," and the work "weeding." In addition, as illustrated in FIG. 6, the notification unit 15c may cause the service provider terminal 20 to display a screen on which the service provider H1 is able to select whether to undertake the notified desired service.

Thus, even when there are multiple desired services which match the providing condition, the service provider H1 is suppressed from being embarrassed in selecting a service, and thus, missing an opportunity to provide a service. Further, since the service corresponding to the health condition of the service provider H1 in consideration of the exercise amount of the service provider H1 is recommended, the effect in promoting the health of the service provider H1 may be expected.

(Flow of Process)

Figure 7:
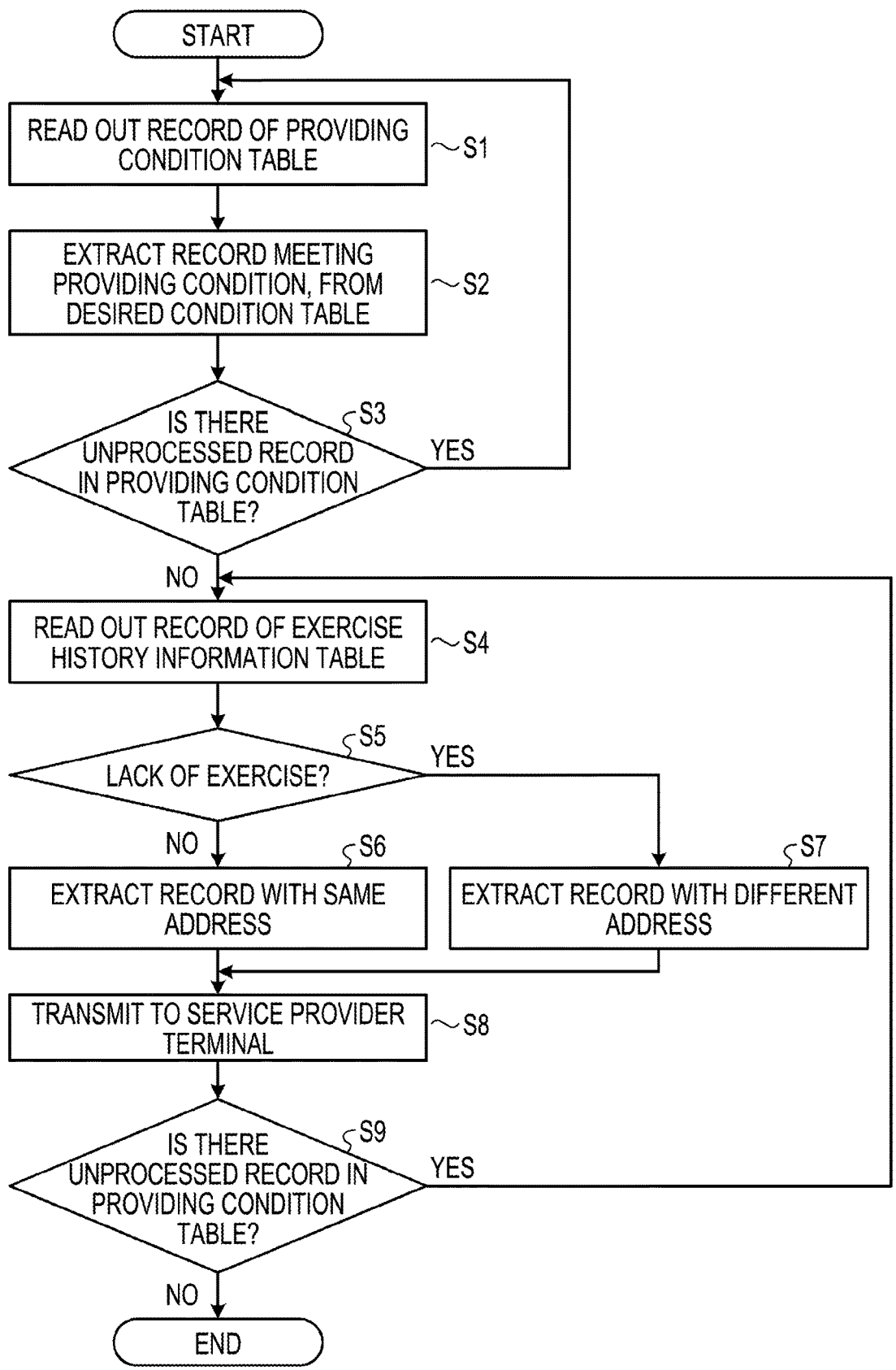
FIG. 7 is a flowchart illustrating a procedure of a providing process according to an embodiment.

FIG. 7 is a flowchart illustrating a procedure of the providing process according to the present embodiment. In an example, as illustrated in FIG. 7, the providing process is started, for example, periodically at a predetermined interval, or when the providing condition table 14a or the desired condition table 14b is updated.

First, the determination unit 15b reads out the record of the providing condition table 14a as a providing condition of a process target (step S1). Further, the determination unit 15b refers to the desired condition table 14b, and extracts a record indicating a desired condition of which the degree of matching with the providing condition is equal to or more than a predetermined threshold value (step S2).

When there is a record unprocessed by the processes of steps S1 and S2 among the records of the providing condition table 14a ("Yes" in step S3), the determination unit 15b returns to the process of step S1. Meanwhile, when the processes of steps S1 and S2 have been completed for all of the records ("No" in step S3), the determination unit 15b proceeds with the process of step S4.

The determination unit 15b refers to the exercise history information table 14c, and determines whether the exercise amount of the service provider H1 of the providing condition of the process target for a predetermined time period is sufficient, based on a predetermined threshold value (steps S4 and S5).

When it is determined that the service provider H1 is not in the lack of exercise ("No" in step S5), the determination unit 15b extracts a record of a desired service in the same town where the distance between the service desired location and the address of the service provider H1 is, for example, less than a predetermined threshold value (step S6).

Meanwhile, when it is determined that the service provider H1 is in the lack of exercise ("Yes" in step S5), the determination unit 15b extracts a record of a desired service in a different town where the distance between the service desired location and the address of the service provider H1 is equal to or more than the predetermined threshold value (step S7).

The notification unit 15c transmits the record of the desired service that has been extracted by the determination unit 15b, to the service provider terminal 20 (step S8).

In addition, when there is a record unprocessed by the processes of steps S4 to S8 among the records of the providing condition table 14a ("Yes" in step S9), the determination unit 15b returns to the process of step S4. Meanwhile, when the processes of steps S4 to S8 have been completed for all of the records ("No" in step S9), the determination unit 15b terminates the series of procedures of the providing process.

(Aspect of Effects)

As described above, in the present embodiment, the storage 14 stores the desired condition table 14b which is the desired condition of the desired service received from the service consumer terminal 30. Further, the storage 14 stores the providing condition table 14a which is the providing condition of the providable service received from the service provider terminal 20. In addition, the determination unit 15b determines a desired service to be transmitted to the service provider terminal 20, based on the degree of matching between the desired condition and the providing condition and the information on the exercise amount of the user H1 of the service provider terminal 20 received from the service provider terminal 20.

Thus, the providing apparatus 10 of the present embodiment recommends a service corresponding to the health condition of the service provider H1 in consideration of the exercise amount of the service provider H1. Accordingly, even when there are multiple desired services which match the providing condition, the service provider is suppressed from being embarrassed in selecting a service, and thus, missing an opportunity to provide a service. Further, the effect in promoting the health of the service provider H1 may be expected.

In addition, the providing apparatus 10 may determine a desired service to be transmitted to the service provider terminal 20, from the desired conditions of which the degree of matching with the providing condition is equal to or more than the predetermined threshold value. In that case, the providing apparatus 10 may determine a desired service to be transmitted to the service provider terminal 20, based on the information on the exercise amount of the user of the service provider terminal 20 and the distance between the service desired location of the desired service and the address of the user of the service provider terminal 20. As a result, it is possible to recommend a desired service requiring a long travel distance to the service desired location, to the service provider H1 in the lack of exercise.

In addition, when the distance between the service desired location of the desired service and the address of the user of the service provider terminal 20 is within the predetermined threshold range, the providing apparatus 10 may determine the desired service to be transmitted to the service provider terminal 20. In that case, the providing apparatus 10 may determine the desired service to be transmitted to the service provider terminal 20 again, based on the information on the exercise amount of the user H1 of the service provider terminal 20 and the distance described above, from the desired conditions of which the degree of matching with the providing condition is equal to or more than the predetermined threshold value. As a result, for example, it is possible to recommend a desired service which does not require a movement by, for example, a car to the service desired location and requires a long walking distance, from the desired services requiring that the distance between the service desired location and the address of the service provider H1 be within the walking distance range, to the service provider H1 in the lack of exercise.

In addition, the providing apparatus 10 may determine the desired service to be transmitted to the service provider terminal 20, from the desired conditions of which the degree of matching with the providing condition is equal to or more than the predetermined threshold value. In that case, the providing apparatus 10 may determine the desired service to be transmitted to the service provider terminal 20 again, based on the information on the exercise amount of the user of the service provider terminal 20 and the workload of the desired service. As a result, it is possible to recommend a desired service requiring a high workload to the service provider H1 in the lack of exercise.

(System)

In addition, among the respective processes described in the respective embodiments, all or some of the processes described as being automatically performed may be manually performed. Alternatively, all or some of the processes described as being manually performed may be automatically performed by a known method. Furthermore, the information including the process procedure, the control procedure, the specific names, and the various data or parameters represented herein or in the drawings may be arbitrarily changed unless otherwise specified.

In addition, each component of the respective illustrated devices is functionally conceptual, and is not necessarily required to be configured physically as illustrated. That is, specific forms of distribution or integration of the respective devices are not limited to those illustrated. That is, all or some of the devices may be configured to be functionally or physically distributed or integrated in arbitrary units depending on, for example, various loads or use conditions. In addition, all or some of the respective process functions performed in the respective devices may be implemented by a CPU and programs analyzed and executed by the CPU, or may be implemented as hardware by a wired logic.

(Hardware Configuration)

Figure 8:
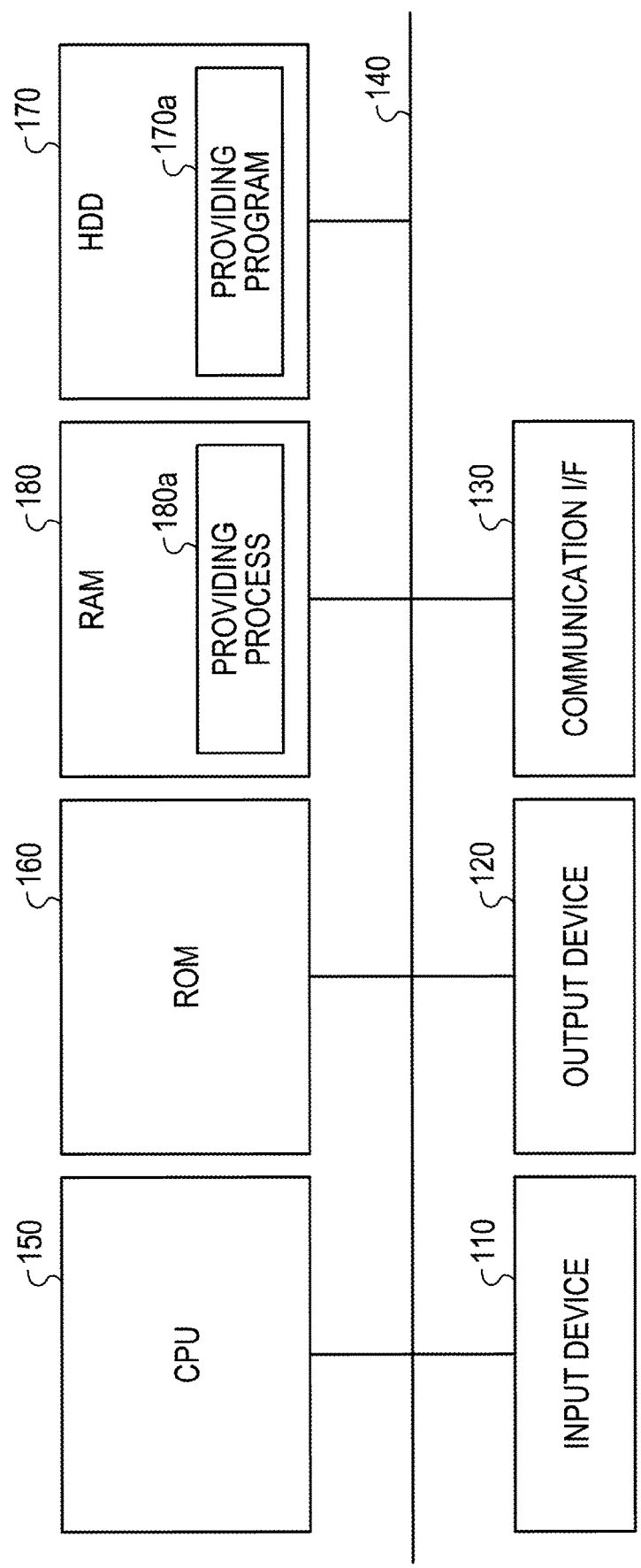
FIG. 8 is a view illustrating an example of a hardware configuration of a computer.

FIG. 8 is a diagram illustrating an example of a hardware configuration of a computer. As illustrated in FIG. 8, a computer 100 includes an input device 110 such as a keyboard or a mouse, an output device 120 such as a display or a speaker, and a communication I/F 130. Further, the computer 100 includes a CPU 150, a ROM 160, an HDD 170, and a RAM 180. The respective units 110 to 180 are connected to each other via a bus 140.

As illustrated in FIG. 8, the HDD 170 stores providing programs 170a that exhibit the same functions as those of the controller 15 represented in the above-described embodiments. The providing programs 170a may be integrated or separated like the respective components of the controller 15 illustrated in FIG. 2. That is, the HDD 170 does not need to store all of the pieces of data represented in the above-described embodiments, and may store data used for the processes.

Under this circumstance, the CPU 150 reads out the providing programs 170a from the HDD 170, and deploys the programs in the RAM 180. As a result, the providing programs 170a function as a providing process 180a as illustrated in FIG. 8. The providing process 180a deploys the various pieces of data read out from the HDD 170 in the area allocated to the providing process 180a in the storage area of the RAM 180, and executes the various processes using the developed various pieces of data. In addition, in the CPU 150, all of the processing units represented in the above-described embodiments may not necessarily operate, and a processing unit corresponding to a process to be executed may be virtually implemented.

In addition, the providing programs 170a may not necessarily be stored in the HDD 170 or the ROM 160 from the beginning. For example, each program is stored in a "portable physical medium" such as a flexible disk, a so-called FD, a CD-ROM, a DVD disk, a magneto-optical disk, or an IC card to be inserted into the computer 100. Then, the computer 100 may acquire each program from the portable physical medium, and execute the program. In addition, each program may be stored in another computer or a server device connected to the computer 100 via, for example, a public line, the Internet, a LAN, or a WAN, and the computer 100 may acquire each program from the device and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for determining a service, the method comprising:
    reading by a computer, from a memory, desired conditions of desired services received from respective service consumer terminals;
    reading, from the memory, a providing condition of a providable service received from a service provider terminal; and
    determining, from among the desired services, a recommended service to be transmitted to the service provider terminal based on exercise information on an exercise amount of a user of the service provider terminal and a degree of matching between the providing condition and each of the desired conditions, the exercise information being received from the service provider terminal,
    wherein each of the desired conditions of the desired services includes a type of a work provided by the user of the service provider terminal.

2. The method according to claim 1, the method further comprising:
    extracting services from among the desired services such that the extracted services have desired conditions of which a degree of matching with the providing condition is equal to or more than a predetermined threshold value; and
    determining the recommended service, from among the extracted services, based on the exercise information and a distance between an address of the user and service desired locations of the extracted services.

3. The method according to claim 2, the method further comprising:
    determining whether the distance is within a predetermined threshold range; and
    performing the extraction when it is determined that the distance is within the predetermined threshold range.

4. The method according to claim 1, the method further comprising:
    extracting services from among the desired services such that the extracted services have desired conditions of which a degree of matching with the providing condition is equal to or more than a predetermined threshold value; and
    determining the recommended service, from among the extracted services, based on the exercise information and workloads of the extracted services.

5. An information processing apparatus comprising:
    a memory configured to store desired conditions of desired services received from respective service consumer terminals and a providing condition of a providable service received from a service provider terminal; and
    a processor coupled to the memory and the processor configured to:
        read the desired conditions from the memory;
        read the providing condition from the memory; and
        determine, from among the desired services, a recommended service to be transmitted to the service provider terminal based on exercise information on an exercise amount of a user of the service provider terminal and a degree of matching between the providing condition and each of the desired conditions, the exercise information being received from the service provider terminal,
    wherein each of the desired conditions of the desired services includes a type of a work provided by the user of the service provider terminal.

6. The information processing apparatus according to claim 5, wherein the processor is further configured to:
    extract services from among the desired services such that the extracted services have desired conditions of which a degree of matching with the providing condition is equal to or more than a predetermined threshold value; and
    determine the recommended service, from among the extracted services, based on the exercise information and a distance between an address of the user and service desired locations of the extracted services.

7. The information processing apparatus according to claim 6, wherein the processor is further configured to:
    determine whether the distance is within a predetermined threshold range; and
    perform the extraction when it is determined that the distance is within the predetermined threshold range.

8. The information processing apparatus according to claim 5, wherein the processor is further configured to:
    extract services from among the desired services such that the extracted services have desired conditions of which a degree of matching with the providing condition is equal to or more than a predetermined threshold value; and
    determine the recommended service, from among the extracted services, based on the exercise information and workloads of the extracted services.

9. A non-transitory computer-readable recording medium having stored therein a program that causes a computer to execute a process, the process comprising:
    reading, from a memory, desired conditions of desired services received from respective service consumer terminals;
    reading, from the memory, a providing condition of a providable service received from a service provider terminal; and
    determining, from among the desired services, a recommended service to be transmitted to the service provider terminal based on exercise information on an exercise amount of a user of the service provider terminal and a degree of matching between the providing condition and each of the desired conditions, the exercise information being received from the service provider terminal,
    wherein each of the desired conditions of the desired services includes a type of a work provided by the user of the service provider terminal.

10. The non-transitory computer-readable recording medium according to claim 9, the process further comprising:
    extracting services from among the desired services such that the extracted services have desired conditions of which a degree of matching with the providing condition is equal to or more than a predetermined threshold value; and determining the recommended service, from among the extracted services, based on the exercise information and a distance between an address of the user and service desired locations of the extracted services.

11. The non-transitory computer-readable recording medium according to claim 10, the process further comprising:

determining whether the distance is within a predetermined threshold range; and performing the extraction when it is determined that the distance is within the predetermined threshold range.

12. The non-transitory computer-readable recording medium according to claim 9, the process further comprising:

extracting services from among the desired services such that the extracted services have desired conditions of which a degree of matching with the providing condition is equal to or more than a predetermined threshold value; and determining the recommended service, from among the extracted services, based on the exercise information and workloads of the extracted services.

* * * * *